United States Patent
Wyke et al.

[11] Patent Number: 5,804,093
[45] Date of Patent: Sep. 8, 1998

[54] JOINT INFILL MOLD

[75] Inventors: Richard L. Wyke, Missouri City; David C. Dressel, Friendswood; James H. McBrien, Houston, all of Tex.

[73] Assignee: Foam Enterprises, Inc., Minneapolis, Minn.

[21] Appl. No.: 556,861

[22] Filed: Nov. 2, 1995

[51] Int. Cl.⁶ .............................. B29C 39/26; B29C 65/00
[52] U.S. Cl. ............................ 249/90; 264/35; 264/36; 425/14; 425/108; 425/117
[58] Field of Search ................. 425/13, 14, 108, 425/117, 129.1; 264/35, 36, 259, 279.1; 249/90

[56] References Cited

U.S. PATENT DOCUMENTS

| | | | |
|---|---|---|---|
| 2,119,415 | 5/1938 | Bodge | 249/90 |
| 2,127,694 | 8/1938 | Miller | 249/90 |
| 2,794,483 | 6/1957 | Hopkins et al. | 249/90 |
| 3,228,712 | 1/1966 | Hausmann et al. | 425/108 |
| 3,397,260 | 8/1968 | Lamberton | 249/90 |
| 3,717,527 | 2/1973 | Benteler | 156/79 |
| 4,442,053 | 4/1984 | Pickering et al. | 249/90 |
| 4,459,251 | 7/1984 | Eldridge et al. | 264/40.5 |
| 4,725,165 | 2/1988 | Langran | 405/169 |
| 5,328,648 | 7/1994 | McBrien et al. | 264/35 |
| 5,489,405 | 2/1996 | Holbert et al. | 264/35 |

FOREIGN PATENT DOCUMENTS

| | | |
|---|---|---|
| 2060817 | 6/1971 | Germany . |
| 1249422 | 10/1971 | United Kingdom . |

*Primary Examiner*—James P. Mackey
*Attorney, Agent, or Firm*—Conley, Rose & Tayon P.C.

[57] ABSTRACT

A system for filling a gap between jacket ends at a joint between two lengths of jacketed pipe is disclosed, comprising: a mold and two pairs of side straps encircling the mold. The mold comprises a sheet of material having first and second ends and opposing side edges, the sheet including a pair of slots cut into the side edges at a predetermined distance from the second end and defining a flap. One pair of straps encircles the mold but passes under the flap through the slots. The second pair of straps encircles the mold and passes over the flap. The mold is positioned around a pipe joint so as to define an annular gap and an infill material is placed in the gap.

20 Claims, 5 Drawing Sheets

JOINT INFILL MOLD

This invention relates to a means and a method for infilling the space at a welded joint in a concrete coated pipeline between the ends of the concrete coatings on sequential lengths of pipe.

BACKGROUND OF THE INVENTION

Offshore pipelines are commonly laid from a continuously moving vessel known as a lay barge. The separate lengths of pipe in the pipeline may be welded together on shore and then coiled on a reel and placed on a lay barge for the pipe laying operation. Alternatively, lengths of the pipe may be placed on the lay barge and the joints may be welded together on the barge just prior to laying the pipeline. In either case, to lay the pipeline one end of the line is passed over rollers and then down an elongate cradle or "stinger" which extends rearwardly and downwardly from the stern of the lay barge to the bed of the body of water. As the barge moves forward, the forward motion of the barge causes the pipeline to be pulled out along the rollers and down the stinger and thereby continuously laid on the bed of the body of water.

Pipelines larger than about 12 inches in diameter are commonly coated with a thick layer of concrete to weigh the pipeline down in the water. Such concrete coatings are applied to individual lengths of the pipe, with the coating extending the full length of the pipe except for several inches near each end. Prior to applying the concrete coating, the pipe joints are usually coated with a material, such as epoxy, to protect the pipe from corrosion. This coating material also terminates several inches from each end. Successive lengths of pipe are joined together by welding, leaving a gap in the coating material and in the concrete covering at each welded joint. It is the usual practice to apply a coating to the pipe in this gap to protect the pipe against corrosion, such as a hot fusion bonded epoxy and/or a shrink sleeve, and to fill the gap between the ends of the concrete coatings so as to provide a smooth, uninterrupted covering for the pipeline. The pipeline can then move smoothly over the rollers and down the stinger to the sea bed.

The gaps are filled with various materials by various techniques. One procedure is to place a metal sleeve or mold over the gap and fill the sleeve with molten mastic which solidifies as it cools. However, in most cases the pipeline must be in a condition for handling immediately after the gaps are filled, so that the laying of the pipeline can proceed without delays. The mastic filling does not set to a sufficiently strong consistency within the required time to allow further processing of the pipe without additional reinforcement to protect the mastic. Therefore, in conventional filling operations where mastic is used, the sleeve is left in place to contain the soft hot mastic, and remains with the pipe on the ocean floor. This is objectionable, since the sleeves tend to corrode, and can eventually open, leaving exposed edges that can snag fishnets and cause other damage to marine operations. Moreover, the filling of the gaps with mastic in this way is highly labor intensive and therefore expensive.

A more effective method is to fill the gap with a fast cure material inside a removable, preferably reusable, mold which removed before the pipe is advanced into the water. Various polymer concretes, such as those disclosed in U.S. Pat. No. 4,608,280, or polyurethanes have been used in this way. Other fast cure polymeric joint infill systems are disclosed in U.S. Pat. No. 5,328,648 and copending patent application now U.S. Pat. No. 5,489,405, both of which are incorporated herein by reference. In these systems, the polymeric infill can be either expanded (foamed) or solid (unfoamed). Likewise, the polymeric infill can be used with or without an inert filler material, such as gravel. One advantage of these polymeric infill systems is that the viscosity of the unreacted polymer components is so low that the joint gap can be filled quickly and effectively, even when the gap is substantially pre-filled with an inert particulate filler. The disadvantage is that the low viscosity of the unreacted chemicals makes them difficult to contain, requiring a liquid seal around the interface between the concrete and the mold. Rigid metal molds are typically not sufficiently conformable to form an adequate seal at the mold/concrete interface.

When an expanded infill is used, the amount of unreacted components placed in the gap can be somewhat in excess of the amount required to fill the gap with foam at a predetermined density. Use of excess materials results in a packed infill and ensures that the gap is completely filled. However, during the foaming and polymerizing reactions the foam exerts significant pressure on the inside of the mold. This internal pressure increases chance of leaks and threatens the integrity of the mold itself. For example, it is known that fiberboard molds that are sufficient to contain a solid (unfoamed) polymeric infill during reaction will burst open if they are used to contain an expanded infill during reaction.

Metal molds are stronger, but tend to be cumbersome and relatively expensive. The molds must include a closable opening of sufficient size to allow the rapid placement of the gap filling material and a means for closing the opening that provides an adequate seal at the opening and can be quickly and easily operated. As the size of the opening increases to allow easier filling of the mold, the difficulty of closing and sealing the opening also increases.

Similarly, the mold must be easily mounted on the pipe, taking into account the fact that the pipe is continuously drawn off the stern of the boat by forward movement of the boat. Often the metal molds that provide sufficient strength and sealability are cumbersome and not easily mounted on the pipe.

Hence it is desired to provide a reusable mold that is light and easily mounted around the pipe joint. The desired mold is also inexpensive and easy to manufacture and should be able to contain either solid or expanded polymer infill, with or without an inert filler material.

SUMMARY OF THE INVENTION

The present invention comprises a one piece, flexible mold that can be easily wrapped around the gap between the ends of a concrete coating at a pipe joint. Two pairs of releasable straps bind the mold to the pipe and hold it shut. The present mold is adapted to contain either pressurized foam or unpressurized liquid gap filling material and provides a seal with the adjacent concrete coating so that the gap filling material is contained within the gap. The present mold can accommodate different diameters of concrete coating without modification and forms an effective seal with even an irregularly shaped outer surface.

The present invention can be operated with chemical release means that avoids the need for a mechanical release means. Alternatively, and preferably, the present invention includes a disposable membrane for releasing the filled joint from the mold wherein the releasing membrane is biocompatible, biodegradable, and not threatening to fishing nets or other marine equipment.

It is an object of the present invention to provide a mold that is easily positioned over a pipe joint, opens easily to provide a large access space for filling of the mold and forms a complete seal when closed. Other objects and advantages of the present invention will become apparent in the following disclosure.

BRIEF DESCRIPTION OF THE DRAWINGS

For a detailed description of a preferred embodiment of the invention reference will now be made to the accompanying drawings wherein.

DESCRIPTION OF THE PREFERRED EMBODIMENTS

Figure 1:
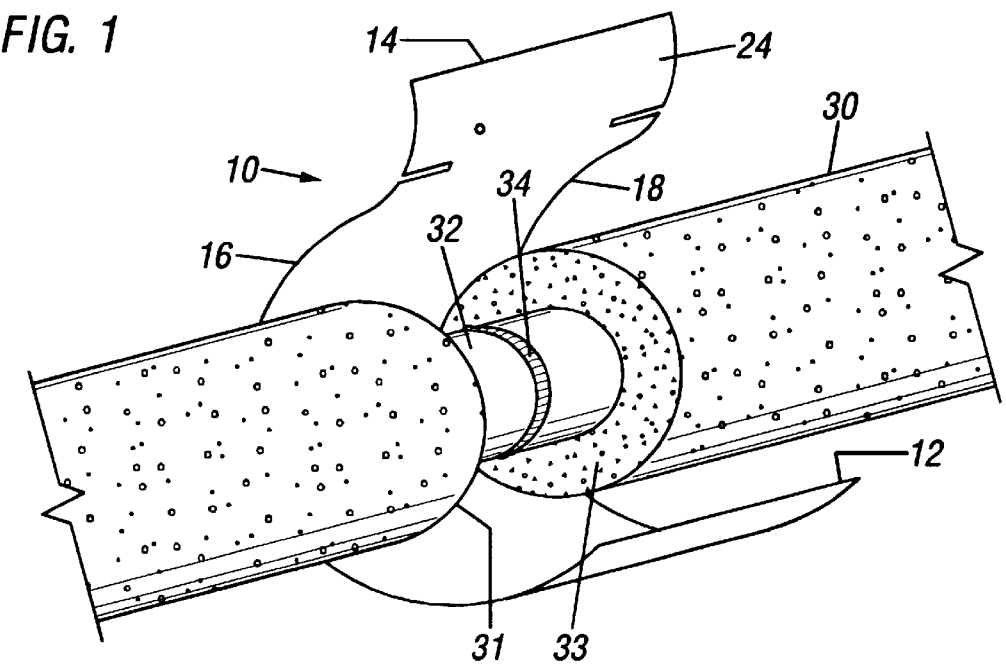
FIG. 1 is a perspective view of an unfilled pipe joint with the mold of the present invention partially in place around it.

Referring now to FIG. 1, two lengths of concrete-jacketed pipe 30 are joined at a weld 34. The concrete jacket terminates some inches short of the ends of the pipe itself, at concrete ends 31, 33. Thus a portion of the pipe 32 remains exposed when weld 34 is made. The present invention provides a system for jacketing the exposed portion 32 between concrete ends 31, 33 quickly, easily and effectively. For ease of understanding, throughout the following discussion the terms "top" and "bottom" refer to the uppermost and lowermost portions of the pipe as it lies in a substantially horizontal position. It will be understood that, while it is preferred to use gravity to facilitate operation of the present system, the orientation of the system is not intended to be a limitation on the claimed invention.

Figure 1A:
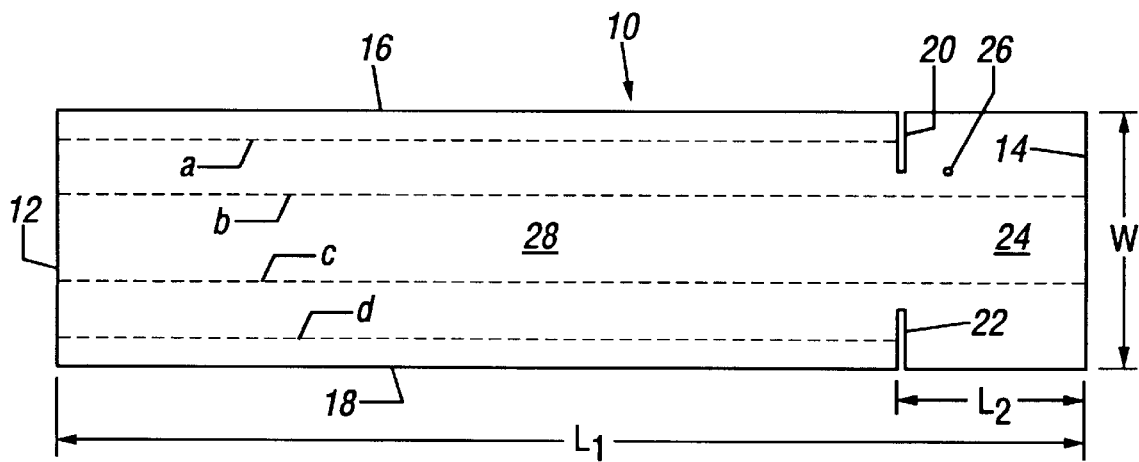
FIG. 1A is a plan view of the mold of FIG. 1 in an uncoiled state.

Referring now to FIG. 1A, the present joint mold comprises a length of sheet metal 10 having a width W and an overall length $L_1$. Width W is preferably greater than the largest anticipated distance between ends 31, 33. $L_1$ is preferably sufficient to allow mold 10 to encircle the diameter of a concrete jacketed pipe. Mold 10 has a first end 12 and a second end 14 and side edges 16, 18. A pair of slots 20, 22 are cut through the thickness of mold 10 at a distance $L_2$ from second end 14. The portion of mold 10 between slots 20, 22 and end 14 defines a flap 24 having dimensions W×$L_2$. A small hole 26 extends through the thickness of mold 10 in flap 24. The balance of mold 10 between slots 20, 22 and first end 12 forms the mold body 28.

Mold 10 is preferably formed from a thin flexible sheet and more preferably is preformed to have some degree of inherent curvature. Examples of suitable materials from which mold 10 can be made include, but are not limited to, metal such as mild steel, galvanized steel (for small diameter pipes), plastics such as polyethylene, and any other suitable material. Mold 10 is preferably 28 gauge to 10 gauge sheet metal. In general, the optimal thickness of mold 10 depends on the diameter of the jacketed pipe and on the stiffness of the material from which mold 10 is made.

When a solid joint infill material is to be molded, the mold may consist of merely a sheet of polyethylene or polypropylene, as the infill material does not expand. When an expanded polymer is used, it is preferred to use a steel mold so that pressure can be held on the polymer during the foaming and setting of the material.

A solid polymer is sometimes preferred because of its higher impact resistance. It is important for underwater pipeline installations that the pipeline be protected from damage by anchors and other devices that may be pulled across the bottom. Expanded polymers, on the other hand, have less impact resistance but cost less, because less polymer is required.

Alternatively, a composite of both solid and expanded polymers may be used to obtain the advantages of the strength and impact resistance of the solid polymer while retaining most of the benefit of the lower cost of the expanded polymer. This embodiment requires a two-step molding process, in which a thin layer of the solid polymer is applied first, with the remainder of the joint gap being filled with an expanded polymer.

Figure 2:
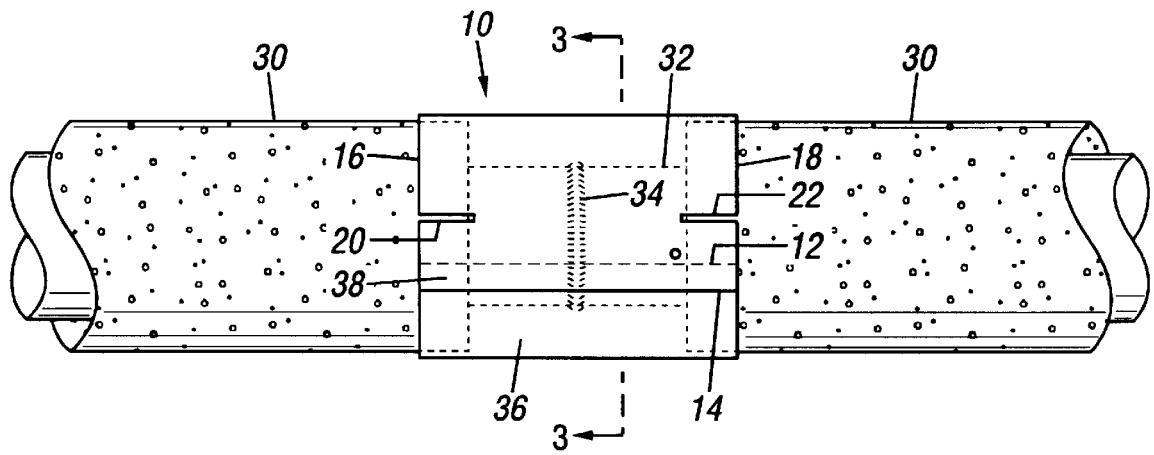
FIG. 2 is a top view of the mold of FIG. 1 positioned around a pipe joint.
Figure 3:
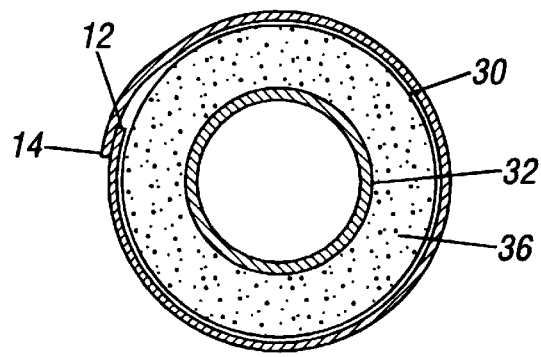
FIG. 3 is a cross-sectional view taken along lines 3—3 of FIG. 2.

Referring now to FIGS. 1 and 2, the first step in using mold 10 is to place it around a welded pipe joint 34 so that weld 34 is approximately centered between side edges 16 and 18. Mold 10 is positioned so that slots 20, 22 are at or near the top side of pipe 30. First end 12 is positioned under second end 14, defining the region of overlap 38. When mold 10 is so positioned, an annular space 36 (FIG. 2) surrounds welded joint 34 between the concrete ends 31, 33. Annular gap 36 is enclosed by mold 10. The length of mold 10 is preferably such that the distance between first end 12 and slots 20, 22 is less than the circumference of the jacketed pipe 30.

Figure 4:
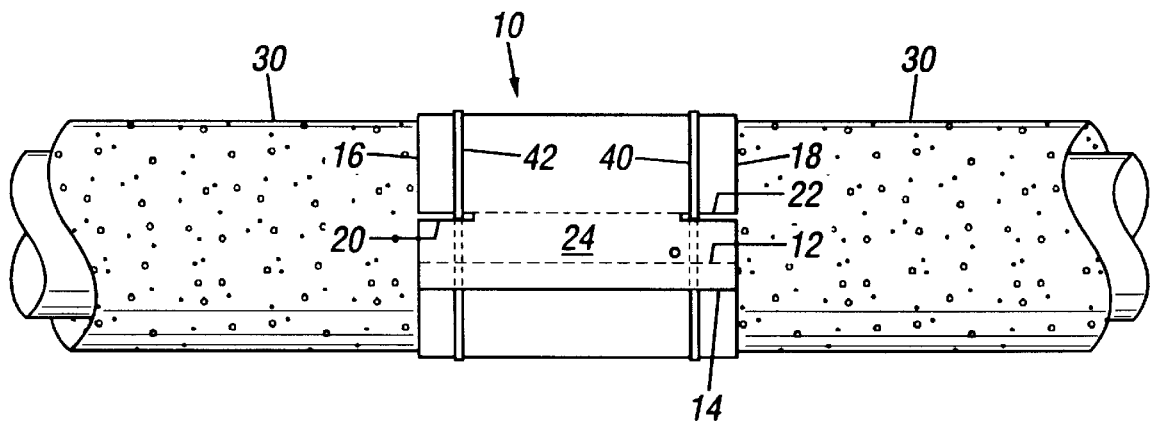
FIG. 4 is a top view of the mold of FIG. 1 positioned around a pipe joint and held by a first pair of bands.

Referring now to FIGS. 1 and 4, two side straps 40, 42 are passed around the outside of mold 10, extending under flaps 24 and through slots 20, 22, respectively, thereby encircling pipe 30. In this manner, straps 40, 42 lie substantially along dotted lines a and d shown in FIG. 1A. Side straps 40, 42 are preferably close enough to side edges 16, 18 to ensure that they overlap the ends 31, 33 of the concrete jacket. When side straps 40, 42 are tightened around mold 10, they cause side edges 16, 18 to come into sealing contact with the concrete jacket along the length of mold 10 from first end 12 to slots 20, 22.

If the mold 10 is a disposable or expendable mold, straps 40, 42 are preferably inexpensive metal straps with conventional crimped clips. If the mold 10 is reusable, reusable nylon straps are prefered. Ratcheting latches are prefered to be used with the nylon straps. With especially large pipes, it may be desirable to use chains instead of straps. It will be understood that any suitable strap and latching means can be used without departing from the scope of the present invention.

Figure 5:
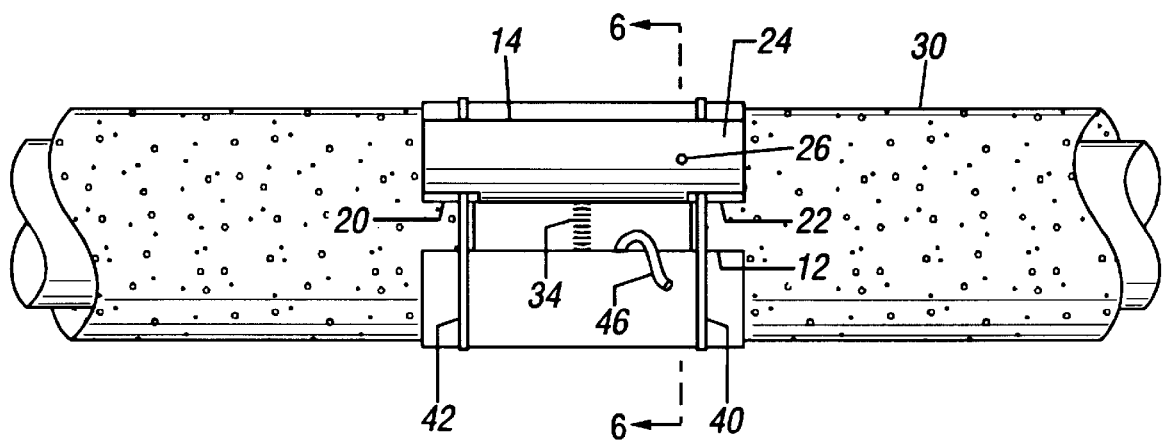
FIG. 5 is a top view of the mold shown in FIG. 4 with the mold in open state.
Figure 6:
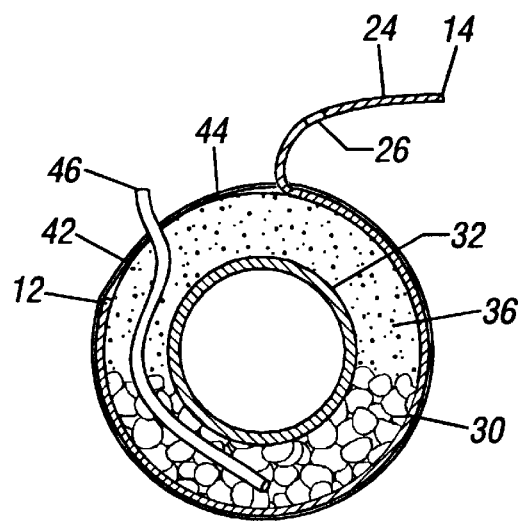
FIG. 6 is a cross-sectional view along line 6—6 of FIG. 5.

Referring now to FIGS. 5 and 6, once side straps 40, 42 are in place, flap 24 can be lifted up and pulled back, leaving an opening 44 between slots 20, 22 and first end 12. Opening 44 provides access to the annular space 36 surrounding the welded joint 34. If a composite joint infill is to be used, the aggregate portion of the composite can be placed in annular space 36 through opening 34, as shown in FIG. 6. Also, a polymer feed tube 46 is positioned in annular gap 36 so that its remote end is approximately at the bottom of gap 36. Feed tube 46 extends out through opening 44. Fill tube 46 is used regardless of whether the joint infill includes an aggregate component.

Figure 7:
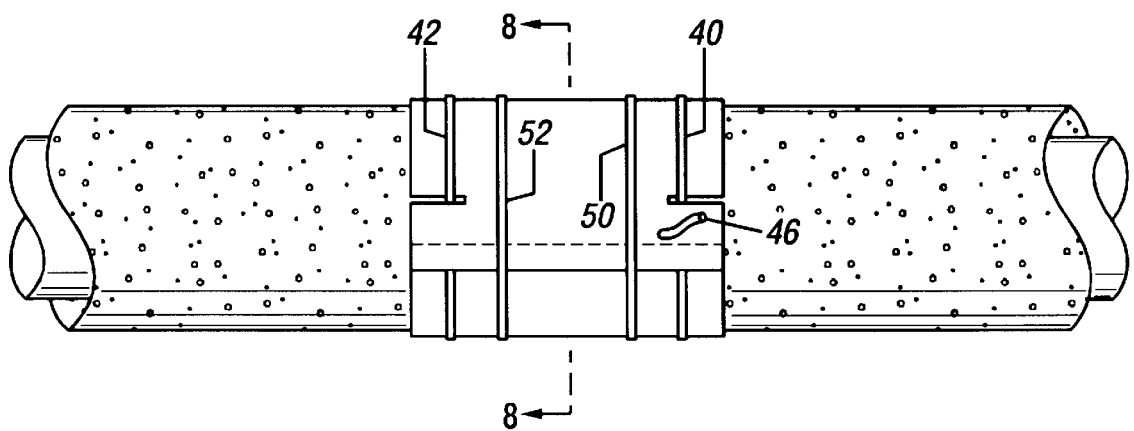
FIG. 7 is a top view of the mold of FIG. 4 in a closed state and held by two pairs of bands.
Figure 8:
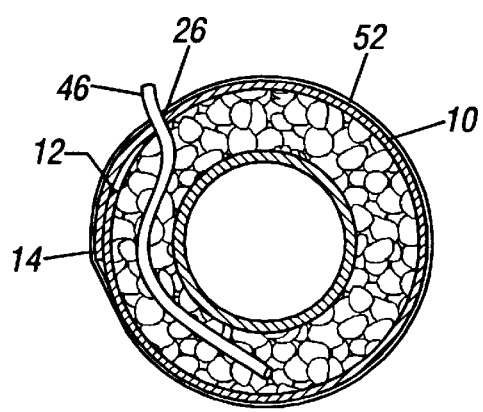
FIG. 8 is a cross-sectional view taken along lines 8—8 of FIG. 7.

Referring now to FIGS. 7 and 8, when feed tube 46 has been placed and annular gap 36 has been completely filled with aggregate, if desired, flap 24 is closed over opening 44. As flap 24 is closed, feed tube 46 is threaded through opening 26 so that it provides access to gap 36 when flap 24 is fully closed. As best shown in FIG. 7, a pair of center straps 50, 52 are positioned around mold 10 between side straps 40, 42. Center straps 50, 52 lie substantially along lines b and c of FIG. 1A. Unlike side straps 40, 42, center straps 50, 52 encircle flap 24 and hold it closed. Alternatively, a single center strap could be used in place of straps 50, 52, but the closure of flap 24 would be less effective.

Feed tube 46 allows the liquid rapid-setting polymer ingredients of the composite joint to fill annular gap 36 from the bottom up, ensuring that the joint is completely in-filled. As the polymer component of the joint infill is fed into gap 36, fill tube 46 is gradually withdrawn allowing gap 36 to be filled from the bottom up. This approach, in combination with the low viscosity of the unreacted polymer mixture, allows the mixture to fully eliminate all voids by filling the interstices between the filler material particles. It will be understood that other means for feeding the polymer components into gap 36 may be provided. For example, feed tube 46 can be run into gap 36 through an opening in mold body 28, through slots 20, 22, or through an opening between mold 10 and pipe 30.

Examples of suitable polymeric joint infill compositions are described in detail in U.S. Pat. No. 5,328,648 and copending patent application now U.S. Pat. No. 5,489,405, cited above. The preferred composition comprises any of the polymer systems sold under the names FJ-150 System, FJ-3000 System and FJ-4000 System, all of which are commercially available from Floatec Corporation, 14019D South Gessner, Missouri City, Tex. 77459, USA.

Once the desired amount of polymer components have been placed in annular gap 36 and fill tube 46 has been withdrawn, it may be desired to place a piece of tape or other sealing material over opening 26. If the joint infill is to comprise solid polymer, no blowing agent is used and the entire volume of annular gap 36 is filled with fast setting polymer. Once the flow of polymer components is stopped, and the polymer is allowed to set up. In from two to five minutes, the mold sheet may be removed, and the pipe is ready to handle.

If the joint infill is to comprise an expanded polymer, the polymer contains a blowing agent. As the chemicals react, they form a foam that expands rapidly. The volume of unreacted liquid polymer in such a case is significantly less than the volume of annular gap 36. Preferably, the volume of liquid polymer is calculated to be that which will expand to fill the entire gap volume and have a desired density when expanded. Desired densities for such foams are typically in the range of 4 to 35 pounds per cubic foot (#/cf), but can range all the way up to 64 #/cf, which is the density of completely unfoamed polymer. In some applications, aggregate is used to fill the volume and provide support in conjunction with either a solid or expanded polymer joint infill. Final foam density depends on the circumference of the pipe, the thickness of the pipe jacket, average size of aggregate particles, and other factors.

Figure 9:
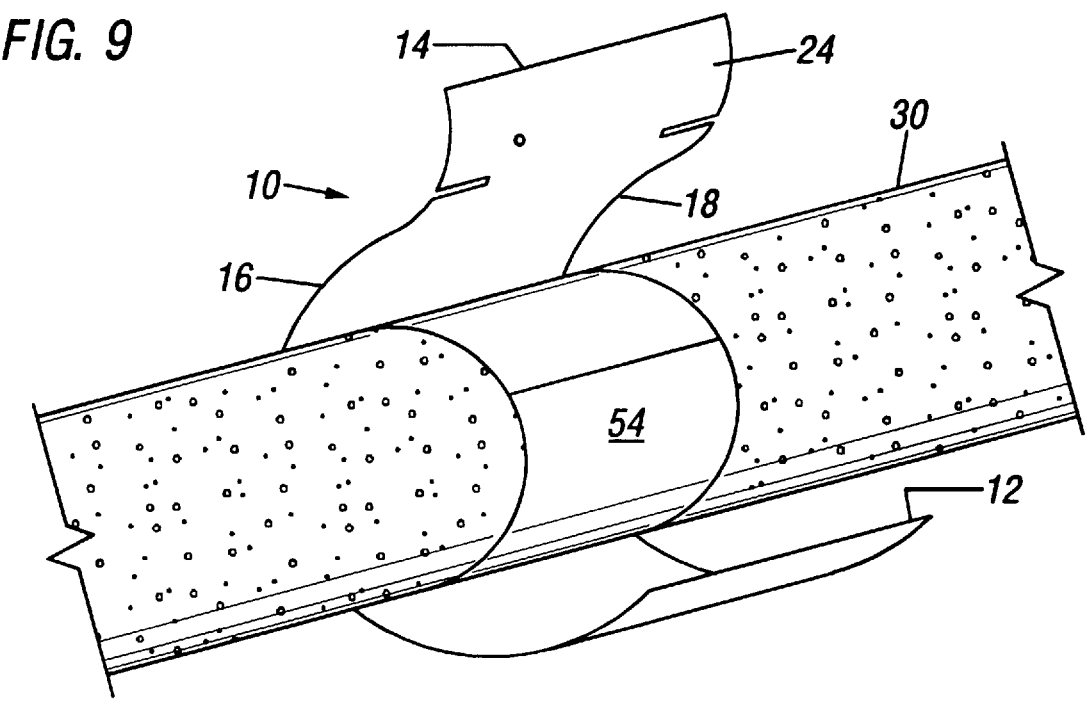
FIG. 9 is a perspective view of an unfilled pipe joint enclosed by a releasing layer, with the mold of FIG. 1 partially in place around it.

Referring now to FIG. 9, in order to facilitate the reuse of mold 10, it is preferred to provide a means for releasing mold 10 from the polymerized joint infill. A preferred releasing means involves the use of a sheet of fiberboard 54 as a liner for mold 10. According to this embodiment, the fiberboard remains as an outer layer on the joint infil when it is placed on the sea floor. The fiberboard is preferably single-panel B-flute corrugated fiberboard. This type of fiberboard includes a flat kraft paper outer layer onto which is laminated an uncoated, corrugated paper layer. The corrugated layer is relatively absorbent. The fiberboard is placed around the pipe joint with the corrugated side inward prior to placement of mold 10. To the extent that openings corresponding to slots 20, 22 and opening 26 are required in the fiberboard liner, they are easily cut in situ once mold 10 is in place.

The presence of the fiberboard liner 54 between mold 10 and concrete pipe jacket 30 enhances the seal along side edges 16, 18, preventing the liquid polymer components from leaking out of the mold before they polymerize. It has been found that tightening of straps 40, 42 around mold 10 cause the corrugations in liner 54 to be crushed against the outside of the pipe jacket. This deformation forms a better seal than could otherwise be formed between mold 10 and the pipe jacket. It has further been found that, before polymerization is complete, the liquid chemicals soak into the corrugated layer, forming a fiber/polymer composite skin. This composite skin enhances the impact resistance of the joint infill in general and in particular greatly reduces the damage that might otherwise be sustained by the fresh joint as it passes over the stinger and off of the lay barge. The fiberboard mold liner/infill skin is particularly preferred with polymeric joint infill systems that do not include a particulate filler. Fiberboard layer 54 also allows mold 10 to be easily removed from the joint infill upon loosening of straps 40, 42, 50 and 52. Because the polymer used to form the infill polymerizes so rapidly, mold 10 can be removed from pipe 30 virtually immediately following completion of the filling operation. Once on the sea floor, any fiberboard that has not been impregnated with polymer generally disintegrates quickly. Because the fiberboard is biodegradable, its impact on the environment is negligible. Furthermore it disintegrates completely and poses no hazard to marine equipment, in contrast to the expendable metal molds currently in use. Alternatively, but not necessarily, a chemical release agent, such as used motor oil, can be applied to the inner surface of mold 10 prior to each joint filling operation. If mold 10 is constructed from polyethylene, it may not be necessary to use any release agent at all.

Mold 10 has no moving parts and is therefore simple to construct and use. It has no hinge points or closures that might be vulnerable to leakage. Because it is flexible, it can conform to a range of pipe diameters and to pipes that are irregular or not quite round. It forms seals in conjunction with the concrete pipe jacket that are capable of retaining unreacted polymer compositions having very low viscosities.

While a preferred embodiment of the invention has been shown and described, modifications thereof can be made by one skilled in the art without departing from the spirit of the invention.

What is claimed is:

1. A system for filling a gap between jacket ends at a joint between two lengths of jacketed pipe, comprising:

a mold, said mold comprising a sheet of material having first and second ends and opposing side edges, said sheet including a pair of slots cut into said side edges at a predetermined distance from said second end and defining a flap between said slots and said second end;

a pair of side straps encircling said mold passing under said second end and said flap and through said slots; and at least one center strap encircling said mold passing over said second end and said flap;

said mold being positioned around a pipe joint so as to define an annular gap between the jacket ends; and an infill material in said annular gap.

2. The system according to claim 1 wherein said sheet has a length greater than the circumference of the jacketed pipe and a width greater than the distance between the jacket ends.

3. The system according to claim 1 wherein said second end overlaps said first end when said mold is closed around the joint.

4. The system according to claim 1 wherein said mold further includes an opening for providing access to said annular gap.

5. The system according to claim 4 wherein said opening is located in said flap.

6. The system according to claim 1 wherein said infill material includes a fast-setting polymer composition.

7. The system according to claim 6, further including an inert filler material in said annular gap.

8. The system according to claim 1 wherein said mold comprises metal.

9. The system according to claim 8 wherein said mold comprises mild steel.

10. The system according to claim 1 wherein said mold comprises plastic.

11. The system according to claim 1, further including a fiberboard liner sheet placed around the pipe between said mold and the pipe.

12. The system according to claim 1, further including a chemical release agent on the inside surface of the mold.

13. A mold for molding an infill in a gap at a pipe joint between lengths of jacketed tubing, comprising:

a strip of material encircling the joint and enclosing the gap, said strip having a first end, first and second sides and a second end that overlaps said first end and having a slot in each of said sides at some distance from said first end, the distance between said slots and said first end being approximately equal to the circumference of the jacketed tubing;

first and second straps encircling said strip and passing under said second end and through said slots, for retaining said strip around said joint; and at least a third strap encircling said mold and passing over said second end.

14. The mold according to claim 13, further including a feed tube extending through said strip for feeding an infill material into the gap.

15. A system for filling a gap between jacket ends at a joint between two lengths of jacketed pipe, comprising:

a mold, said mold comprising a sheet of material having first and second ends, opposing side edges, a length greater than the circumference of the jacketed pipe and a width greater than the distance between the jacket ends, said sheet including a pair of slots cut into said side edges at a predetermined distance from said second end and defining a flap between said slots and said second end, said second end overlapping said first end when said mold is on the pipe;

a pair of side straps encircling said mold passing under said second end and said flap and through said slots; and a pair of center straps encircling said mold passing over said second end and said flap;

said mold being positioned around a pipe joint so as to define an annular gap; and a fast-setting polymer material in said gap.

16. The system according to claim 15, further including an inert filler material in said annular gap.

17. The system according to claim 16 wherein said filler material comprises aggregate.

18. The system according to claim 16 wherein said mold comprises steel.

19. The system according to claim 18, further including a fiberboard liner between said mold and the pipe.

20. The system according to claim 16 wherein said mold comprises plastic.

* * * * *